US010363856B1

(12) United States Patent
Talke et al.

(10) Patent No.: US 10,363,856 B1
(45) Date of Patent: Jul. 30, 2019

(54) STOWABLE PAYLOAD CARRIER

(71) Applicant: SPAWAR Systems Center Pacific, San Diego, CA (US)

(72) Inventors: Kurt A. Talke, San Diego, CA (US); Aaron B. Burmeister, La Mesa, CA (US); Daniel Leung, San Diego, CA (US); Mendel L. Baker, Jr., San Diego, CA (US); Matthew E. Jones, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 42 days.

(21) Appl. No.: 15/697,157

(22) Filed: Sep. 6, 2017

(51) Int. Cl.
  *A61G 3/06* (2006.01)
  *B60P 1/64* (2006.01)
  *B25J 5/00* (2006.01)

(52) U.S. Cl.
  CPC .............. *B60P 1/64* (2013.01); *B25J 5/005* (2013.01); *Y10S 901/01* (2013.01)

(58) Field of Classification Search
  CPC ................................................. A61G 3/067
  USPC ............................. 414/462, 680, 558; 901/1
  See application file for complete search history.

(56) References Cited

U.S. PATENT DOCUMENTS

| 4,836,337 | A | | 6/1989 | Borrelli | |
|---|---|---|---|---|---|
| 4,979,015 | A | * | 12/1990 | Stierman | H01L 21/481 257/778 |
| 5,984,613 | A | * | 11/1999 | Motilewa | B60R 9/06 224/519 |
| 7,258,362 | B2 | | 8/2007 | Thurm | |
| 7,784,570 | B2 | | 8/2010 | Couture | |
| 9,656,704 | B2 | | 5/2017 | Couture | |
| 9,770,825 | B2 | * | 9/2017 | Goldenberg | B25J 9/08 |
| 2007/0260378 | A1 | * | 11/2007 | Clodfelter | F41H 11/12 701/48 |
| 2012/0189413 | A1 | * | 7/2012 | Richiger | A01F 25/20 414/310 |
| 2015/0377586 | A1 | | 12/2015 | Szlemko | |

* cited by examiner

*Primary Examiner* — Saul Rodriguez
*Assistant Examiner* — Willie Berry, Jr.
(74) *Attorney, Agent, or Firm* — Naval Information Warfare Center Pacific; Kyle Eppele

(57) ABSTRACT

The stowable payload carrier (SPC) apparatus and system described herein may be used in conjunction with a robot. The SPC includes a payload holder assembly, the payload holder assembly being configured to receive one or more payloads of a plurality of different sizes, the payload holder assembly being adjustable to accommodate dimensions of the one or more payloads of the plurality of different sizes. The SPC also includes an actuation device configured to cause the payload holder assembly to rotate, extend and/or retract among one or more deployed configurations and a stowed configuration, the actuation device being operably coupled to the payload holder assembly, wherein the actuation device payload holder assembly is configured to be accessible by a manipulator arm.

9 Claims, 4 Drawing Sheets

STOWABLE PAYLOAD CARRIER

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102,534.

BACKGROUND OF THE INVENTION

Field of Invention

This disclosure relates to payload carriers, and more particularly, stowable payload carriers.

Description of Related Art

Currently, hazardous devices and other payloads may be disposed of or handled using special-purpose robots or other unmanned vehicles. Special purpose robots or other unmanned vehicles may also be used in the packaging industry to automate packaging. In their existing forms, these robots or unmanned vehicles may have manipulator arms with limited or restricted motion capabilities. Because of their limited or restricted range-of-motion capabilities, it may be difficult for these robots or other unmanned vehicles to handle payloads that are not positioned within reach of their limited/restricted manipulator arms.

There is a need for special purpose robots or other unmanned vehicles that have increased motion capabilities for use in handling various payloads, including hazardous devices and devices to be packaged.

BRIEF SUMMARY OF INVENTION

The present disclosure addresses the needs noted above by providing a stowable payload carrier that may be used in conjunction with a manipulator arm of an unmanned vehicle. The stowable payload carrier comprises a payload holder assembly, the payload holder assembly being configured to receive one or more payloads of a plurality of different sizes, the payload holder assembly being adjustable to accommodate dimensions of the one or more payloads of the plurality of different sizes.

The stowable payload carrier further includes an actuation device configured to cause the payload holder assembly to rotate, extend and/or retract among one or more deployed configurations and a stowed configuration, the actuation device being operably coupled to the payload holder assembly, wherein the payload holder assembly is configured to be accessible by a manipulator arm.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the stowable payload carrier. In the drawings.

DETAILED DESCRIPTION OF THE INVENTION

A stowable payload carrier apparatus and system are described herein. The apparatus and system may be used to assist robots and other unmanned vehicles in accessing and handling payloads. The present apparatus and system may be particularly useful where such robots and unmanned vehicles have limited ranges of motion.

The stowable payload carrier apparatus and system described herein may include a tray that is configured to receive one or more payloads of a plurality of different sizes. The tray may be adjustable in order to accommodate dimensions of payloads of different sizes. The stowable payload carrier may also include an actuator that causes the tray to rotate, extend and/or retract among one or more deployed configurations and a stowed configuration. The actuator may be operably coupled to the tray. The tray may be accessible by an existing manipulator arm of a robot or other unmanned vehicle.

The unmanned vehicles that may be used in conjunction with the stowable payload carrier may be ground-based robots or other autonomous devices, whether aerially-based, water-based or ground-based. For purposes of the present disclosure, a "robot" is a mechanical device that is capable of performing a variety of tasks on command or by being programmed in advance. The tasks performed by the robot may include, but are not limited to, moving in a particular direction or delivering/retrieving a payload.

The stowable payload carrier described herein enables a robot to carry a payload on the side of the robot in a stowed position. The payload may be essentially any device, including a hazardous device such as an explosive charge. Essentially any payload that can be held by the payload holder is suitable for use with the present stowable payload carrier. The stowable payload carrier may be used to assist a robot's manipulator arm in accessing a payload. The payload may be otherwise difficult to access by the manipulator arm because of the area or region in which the payload is located.

Figure 1:
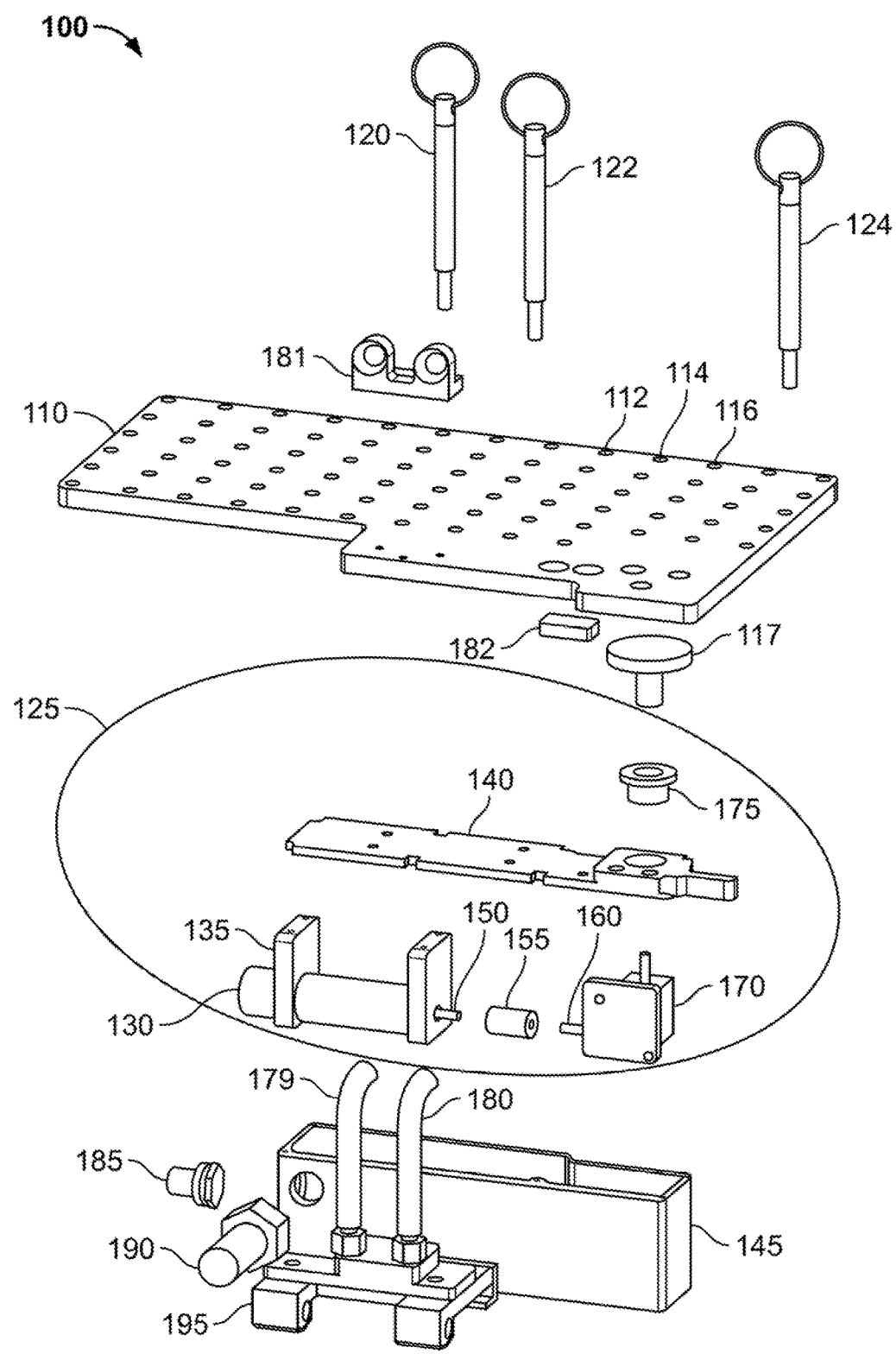
FIG. 1 is an exploded view of a stowable payload carrier in accordance with one embodiment of the present disclosure.

FIG. 1 illustrates an exploded view of a stowable payload carrier 100 in accordance with one embodiment of the present disclosure. As shown in FIG. 1, the stowable payload carrier 100 includes a payload holder assembly 110. In the present example, the payload holder assembly 110 is a tray having apertures, e.g., apertures 112, 114, 116, disposed therethrough. The payload holder assembly 110 is configured to receive one or more payloads of a plurality of different sizes. The payload holder assembly 110 is adjustable to accommodate dimensions of the one or more payloads of the plurality of different sizes.

In the instant example, payload holder assembly 110 is an aluminum tray that supports the payload during operation. The payload holder assembly 110 has a grid hole pattern formed by apertures, e.g., apertures 112, 114, 116, for the attachment of a plurality of payload locating pins 120, 122, 124 which may act to form a cage that secures the payload so that the payload does not fall out when the stowable payload carrier is extended, retracted and/or rotated. The payload locating pins 120, 122, 124 may be easily removable and relocate-able to accommodate and hold various payload sizes. The payload locating pins, e.g., payload locating pins 120, 122, 124, may each have a collar at the top to give them a particular height.

The stowable payload carrier 100 also includes an actuator 125 configured to rotate, extend and/or retract the payload holder assembly 110 among multiple degrees of freedom. The actuator 125 may be linear or rotary or otherwise. When the actuator 125 is activated, it may cause the stowable payload carrier 100 to rotate, extend and/or retract among a stowed configuration and one or more deployed configurations. The actuator 125 is configured to allow the payload holder assembly 110 to be accessible by a manipulator arm in at least some of the one or more deployed configurations of the stowable payload carrier 100. In lieu of a manipulator arm, another moveable device may access the payload holder assembly 110 and/or its associated payload.

In the present embodiment, the actuator 125 is a rotation mechanism. A number of components make up the rotating mechanism embodiment of the actuator 125. Where the actuator 125 is a rotation mechanism, the rotation mechanism may include an encoder-motor-gear-box 130, motor mounts 135, lid 140, housing 145, motor output shaft 150 and motor coupling 155. Encoder-motor-gearbox 130 is rigidly mounted to the motor mounts 135. The motor in encoder-motor-gearbox 130 may be any number of motors suitable to cause the payload holder assembly to rotate, extend or retract, including but not limited to, a 12V electrical DC motor with 6.24 milli-Newton meters (mNm) nominal torque, and a planetary gearhead with a 1014:1 gear ratio reduction. The encoder-motor-gearbox 130 may be a combined unit as shown in FIG. 1. In lieu thereof, encoder-motor-gearbox 130 may be built into the same physical component, but separate.

An encoder in the encoder-motor-gearbox 130 is used to sense the position of the motor output shaft 150 and through geometry and gear ratio, sense the position of the payload holder assembly 110. The encoder in the encoder-motor-gearbox 130 may be located to the left of motor mounts 135. The motor mounts 135, and encoder-motor-gearbox 130 may be located adjacent to each other and may be a separate unit or a combined unit.

The motor mounts 135 are rigidly mounted to lid 140 which may be rigidly mounted to overall housing 145. Motor mounts 135 may be mechanical brackets to support the encoder-motor-gearbox 130. Then the motor output shaft 150 of encoder-motor-gearbox 130 is attached to a motor coupling 155 which is, in turn, attached to the shaft 160 of the right angle gearbox 170. Motor coupling 155 may be a shaft coupling that connects the right angle gearbox 170 with the encoder-motor-gearbox 130. This type of coupling allows for some tolerance stack-up and misalignment. Right angle gearbox 170 is a 1:1 right angle bevel gearbox which transfers rotation in the x-axis to rotation in the z-axis.

A brass tray bushing 175 is configured to press into lid 140, which provides mechanical support for the tray coupling 117. Lid 140 includes a groove for an O-ring to keep moisture out of the housing 145. Tray bushing 175 may be a bronze plain bushing that has a slip fit with the tray coupling 117 allowing it to rotate while supporting the forces and moments from the weight of a payload (not shown in FIG. 1).

Tray coupling 117 is connected to the output shaft of the right angle gearbox 170 with a set screw, spline or D-shaft connection (not shown in FIG. 1). Tray coupling 117 may be formed of stainless steel, and may provide a connection between the payload holder assembly 110 and the right angle gearbox 170. Tray coupling 117 may also act as a plain bearing to support the forces and moments due to the weight of the payload (not shown in FIG. 1). An O-ring (not shown in FIG. 1) on the tray coupling 117 prevents moisture from entering the housing 145, which may house the encoder-motor-gearbox 130. Tray coupling 117 rests on tray bushing 175 to provide a friction fit. Tray coupling 117 may attach to payload holder assembly 110 via screws or other attachment means.

Bungee attach pins 179, 180 may act to further secure a payload that has been fastened to payload holder assembly 110 with payload locating pins 120, 122, 124. Bungee attach pins 179, 180 may serve as a location to attach bungee cords (not shown in FIG. 1) to secure a payload while the stowable payload carrier 100 is in the stowed position. The bungee attach pins 179, 180 may disengage from the tray retract hard stop 181 when the payload holder assembly 110 rotates in front of an unmanned vehicle (not shown in FIG. 1), thus unlocking the bungee attach pins 179, 180 and releasing the bungee and thus the payload (not shown in FIG. 1). These bungee attach pins 179, 180 may also serve as a hard stop when the payload holder assembly 110 retracts.

Tray retract hard stop 181 is used to make sure payload holder assembly 110 does not retract beyond a certain point in the x-y plane, and become an obstruction to a manipulator arm of an unmanned vehicle. Tray retract hard stop 181 may also be used to make sure the payload holder assembly 110 is properly stowed, and that the payload holder assembly 110 does not move past the stowed position. Proximity sensor 190 is configured to sense a location of the manipulator arm and to cause the payload holder assembly 110 to move. Additionally, the tray retract hard stop 181 causes the payload holder assembly 110 to stop moving when it goes beyond a certain point. The actuator 125 allows for full 360 degree (360°) motion, and the actuator 125 is capable of permitting the payload holder assembly 110 to rotate at an angle of one hundred eighty degrees (180°).

A tray extend hard stop 182 is a mechanical hard stop that prevents the payload holder assembly 110 from moving past a certain point in the extended position of the payload holder assembly 110. The tray extend hard stop 182 may stop the payload holder assembly 110 by physically hitting the right end of the lid 140. This helps to ensure that a manipulator arm of an unmanned vehicle is able to grab a payload.

It should also be noted that there may be a software hard stop (not shown in FIG. 1) that tells the encoder-motor-gearbox 130 how far to rotate, extend and/or retract. If the payload holder assembly 110 were in harm's way (which may be the case when it is extended), the proximity sensor 190 may be configured such that it will command the actuator 125 to move the payload holder assembly 100 out of harm's way as the manipulator is extended. The proximity sensor 190 may generally be set up to cause the payload holder assembly 110 to move when a manipulator arm on an unmanned vehicle (not shown in FIG. 1) is in a certain position (e.g., when the manipulator arm is in a stowed position and the payload holder assembly 110 can move freely). The proximity sensor 190 may also generally be set up to trigger the actuator 125 based on movement of a manipulator arm (not shown in FIG. 1).

The manipulator arm (not shown in FIG. 1) on an unmanned vehicle may be subject to a fair amount of movement, and may serve a number of different purposes. For example, the manipulator arm may have a gripper that is capable of holding a camera or picking up/delivering items. In lieu of a gripper, the manipulator arm may also have other tools on the end, e.g., a cutter wheel or other tool. The stowable payload carrier 100 may act as a toolbox to store these various tools.

An electrical connector 185 is shown in FIG. 1. A control signal may enter the housing 145 through this electrical connector 185. The control signal may communicate with the proximity sensor 190 and the encoder-motor-gearbox 130. The housing 145 may house the encoder-motor-gearbox 130 and the proximity sensor 190.

Proximity sensor 190 may be integrated into the housing 145. Proximity sensor 190 may detect when a manipulator (not shown in FIG. 1) extends in front of a robot (not shown in FIG. 1). Proximity sensor 190 may cause payload holder assembly 110 to move when another object is within a predetermined distance from payload holder assembly 110. Through use of proximity sensors, e.g., proximity sensor 190, operation of the stowable payload carrier 100 may be automatic or passive so that the operator does not have to perform manipulator actions in order to extend or retract the payload. In lieu of manipulator actions, the proximity sensor 190 may be triggered to extend, retract or rotate the payload carrier 100 among a stowed configuration and one or more deployed configurations.

A quick-release pin 195 may allow for the quick removal of the entire stowable payload carrier 100 by removing one push-release pin.

The stowable payload carrier described herein has a number of beneficial features. For example, the quick-release pin 195 may allow for easy installation and removal. The stowable payload carrier 100 can be stowed when not in use, thus providing for space-saving and other benefits when not in use. The stowable payload carrier 100 can deploy payloads without the constant use of a manipulator that is a part of an unmanned vehicle. The stowable payload carrier 100 includes releasable bungee attach pins 179, 180 that allow for secure handling of a payload. The actuator 125 for moving the payload holder assembly 110 may be automatically actuated so that the payload holder assembly 110 automatically moves into its stowed and deployed positions. The proximity sensor 190 can aid in queuing proper positioning of the payload holder assembly 110. The payload holder assembly 110 of the stowable payload carrier 100 also has the ability to accommodate varying payload sizes and shapes.

In using the present stowable payload carrier 100, an operator may perform a series of manipulator actions via an operator control unit (OCU) which, in conjunction with the proximity sensor 190, may be used to remotely control a robot and its manipulator arm in order to retrieve a payload. The operator may retract a manipulator arm (lowest, or first link of the manipulator) using the given OCU (not shown in FIG. 1). Once the manipulator arm reaches a specified point, it triggers the proximity sensor 190 to start extending (or rotating) the payload carrier 100 from the stowed position. The payload carrier 100 may extend out to hard stops, which may include tray extend hard stop 182 and a tab on lid 140. This, in turn, may trigger the motor in encoder-motor-gearbox 130 to stop extending.

The operator manipulates, via the OCU, a manipulator arm (not shown in FIG. 1) on an unmanned vehicle to grab the payload. The operator uses the OCU to extend the manipulator. When the lower or first manipulator link reaches a specified point, it triggers a second, or "extend" proximity sensor (not shown in FIG. 1) to start retracting or rotating the payload carrier 100 from the extended position. The payload carrier 100 retracts until the tray retract hard stop 181 hits the bungee attach pins 179, 180. The hard stop 181 triggers the motor in encoder-motor-gearbox 130 to stop retracting. Another series of manipulator actions retracts or stows the payload carrier 100, restoring full unobstructed use to one or more manipulator arms of the robot or unmanned vehicle. The operator continues using the manipulator with the OCU to place or otherwise perform actions in connection with the payload.

Another series of manipulator actions retracts or stows the payload carrier, restoring full unobstructed use to one or more manipulator arms of the robot or unmanned vehicle.

Figure 2:
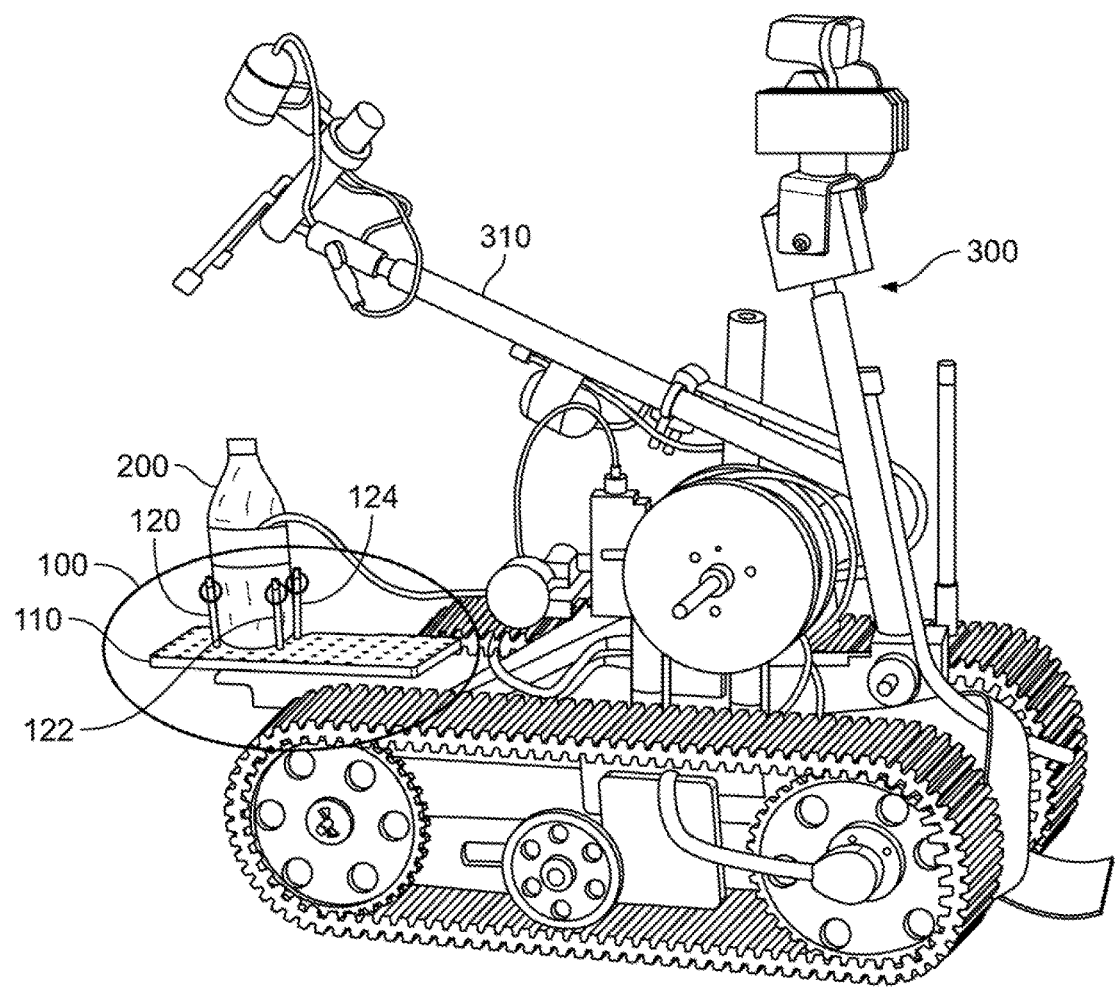
FIG. 2 illustrates the stowable payload carrier as attached to an unmanned ground vehicle or robot in accordance with one embodiment of the present disclosure.
Figure 3:
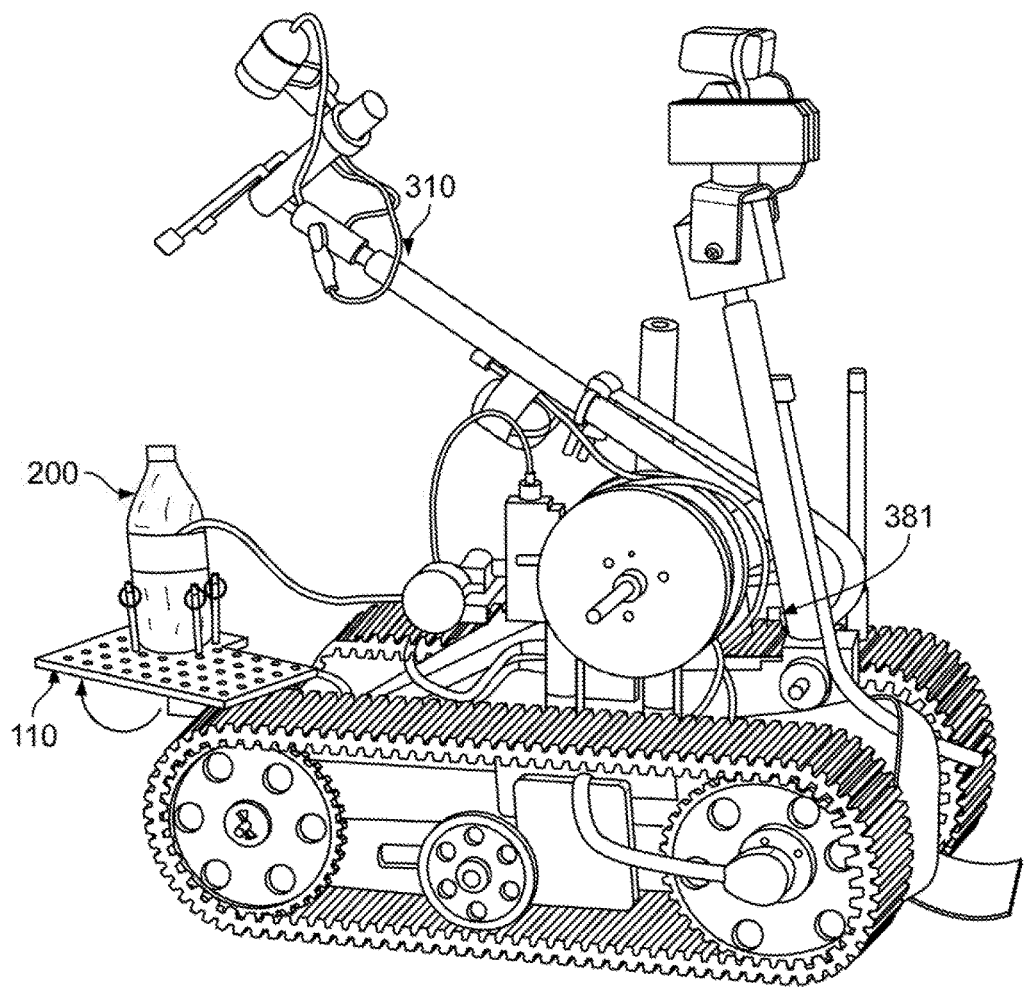
FIG. 3 illustrates the stowable payload carrier as it rotates on an unmanned ground vehicle or robot in accordance with one embodiment of the present disclosure.
Figure 4:
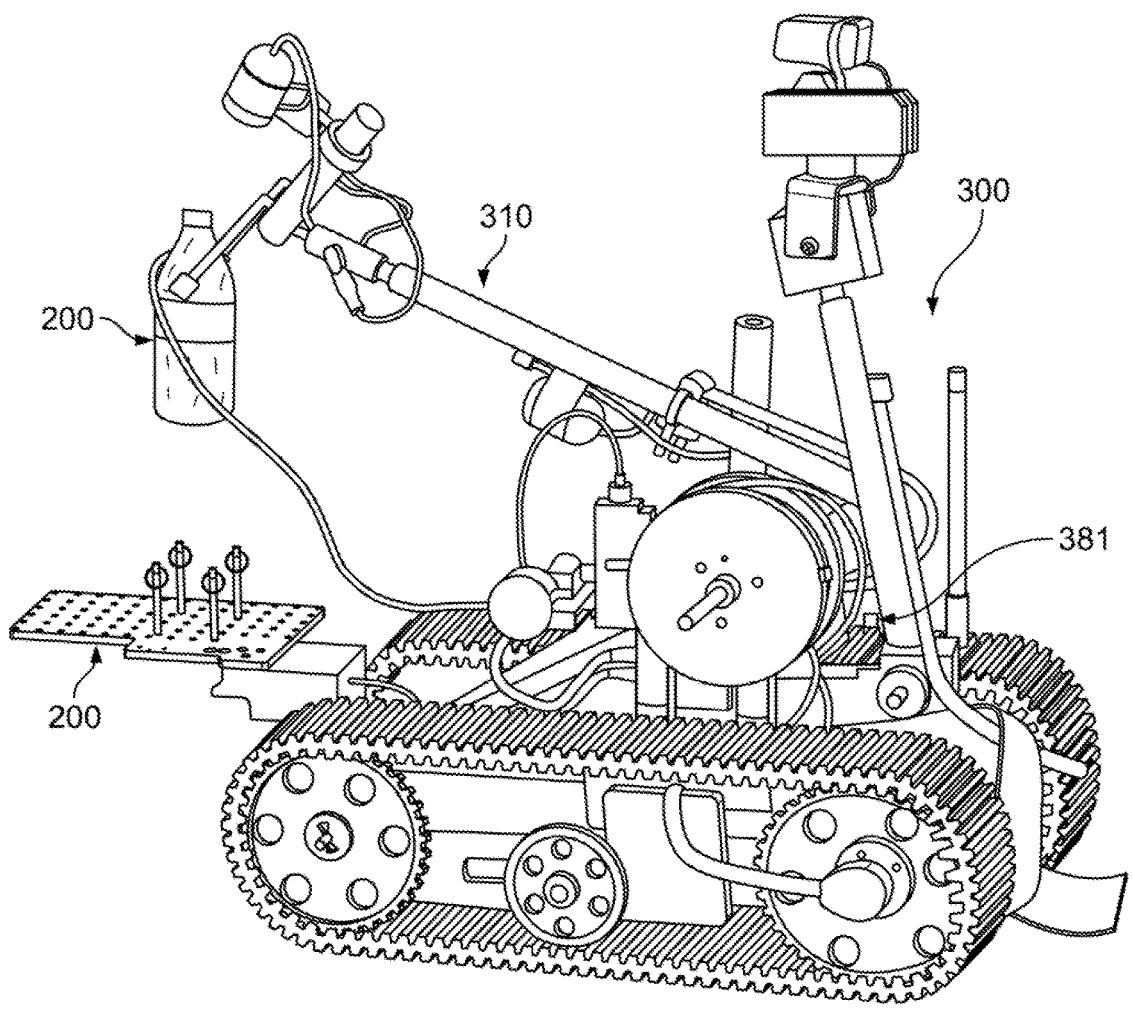
FIG. 4 illustrates the stowable payload carrier as its payload is being picked up by a manipulator on an unmanned ground vehicle or robot in accordance with one embodiment of the present disclosure.

FIGS. 2-4 show the stowable payload carrier in operation as it moves between stowed and deployed configurations. Referring now to FIG. 2, illustrated is the stowable payload carrier 100 as attached to an unmanned vehicle 300 or robot in accordance with one embodiment of the present disclosure. In this case, unmanned vehicle 300 is an unmanned ground vehicle. The stowable payload carrier 100 has a payload 200 sitting atop the stowable payload carrier 100. The payload 200 may attach to the unmanned vehicle 300, e.g., a robot, with a removable, quick release pin (not shown in FIG. 2).

The unmanned vehicle may be any type of vehicle that can move via remote operation or without a driver. The unmanned vehicle 300 may have been driven to a particular location to retrieve this payload 200, or the unmanned vehicle 300 may transport the payload 200 to a particular location. The stowable payload carrier 100 allows for the storing of a payload 200 to the side of the unmanned vehicle 300, thus leaving the manipulator 310 for the unmanned vehicle 300 available for use with other tasks. An adjustable pin pattern on the payload holder assembly 110 of stowable payload carrier 100 allows for convenient placement of the payload 200 on the payload holder assembly 110 with easily removable payload locating pins 120, 122, 124.

Referring now to FIG. 3, once a proximity sensor 381 detects that the operator has retracted the first link/arm of the manipulator arm 310 to the fully stowed position (as it has been in FIG. 3), an actuator assembly (not shown in FIG. 3) rotates the payload holder assembly 110 one hundred eighty degrees (180°) out in front of the robot so that the manipulator arm 310 can pick up the payload 200. A proximity sensor (not shown in FIG. 3) built into the stowable payload carrier 100 senses when the manipulator arm 310 extends in front of the unmanned vehicle 300 to place the payload 200. The proximity sensor 381 triggers a control system (not shown in FIG. 3) to start the actuator (not shown in FIG. 3) and retract the stowable payload carrier 100. The control system for the stowable payload carrier 100 may reside in hardware and software on stowable payload carrier 100, and then instructs the payload holder assembly 110 to move back to the stowed position to allow full use of the manipulator arm 310.

FIG. 4 illustrates the payload 200 as it is being picked up by a manipulator arm 310 from a payload holder assembly 110 on an unmanned vehicle 300 or robot in accordance with one embodiment of the present disclosure. After the payload 200 has been picked up, the manipulator arm 310 may extend forward. The extend proximity sensor 381 may activate, and the stowable payload carrier 100 may retract to the stowed position.

The present apparatus and system may be used under a number of circumstances, including disposal or handling of hazardous devices and other payloads, as well as packaging. In addition, the present apparatus and system may be used in medical emergencies. Instead of sending a live person into dangerous territory to an injured person, one may be able to deliver supplies via off-the-shelf robot and adapted stowable payload carrier to the injured person.

The stowable payload carrier may also be used to assist in a communications network. For example, a robot may transport a relay radio payload on the stowable payload carrier in order to get network coverage in an area where coverage may not already exist.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A stowable payload carrier apparatus, comprising:
   a payload holder assembly; and
   an actuation device configured to cause the payload holder assembly to rotate, extend, and retract among one or more deployed configurations and a stowed configuration;
   wherein the payload holder assembly includes a tray having pin-receiving apertures, wherein pins may be disposed into said pin-receiving apertures in a pattern to facilitate securing a payload on the payload holder assembly, and wherein the pattern is reconfigurable.

2. A stowable payload carrier apparatus, comprising:
   a payload holder assembly;
   an actuation device configured to cause the payload holder assembly to rotate, extend, and retract among one or more deployed configurations and a stowed configuration;
   a first proximity sensor configured to sense a location of a manipulator arm and to cause the payload holder assembly to avoid physically contacting the manipulator arm; and,
   a tray retract hard stop operably coupled to the first proximity sensor, wherein the tray retract hard stop is configured to stop the payload holder assembly from retracting when the first proximity sensor senses that the payload holder assembly is within a first predetermined distance from the manipulator arm;
   a second proximity sensor attached to an unmanned vehicle; and
   a tray extend hard stop operably coupled to the second proximity sensor, wherein the tray extend hard stop is configured to stop the payload holder assembly from extending when the second proximity sensor senses that the payload holder assembly is within a second predetermined distance from the manipulator arm.

3. The apparatus of claim 2, wherein the manipulator arm is operably coupled to an unmanned vehicle.

4. The apparatus of claim 3, wherein the unmanned vehicle is a ground vehicle.

5. A stowable payload carrier system, comprising:
   a payload holder assembly configured to receive one or more payloads;
   an unmanned vehicle having a manipulator arm;
   an actuation device configured to rotate, extend, and retract the payload holder assembly; and
   a proximity sensor configured to sense a location of the manipulator arm and to cause the payload holder assembly to avoid physically contacting the manipulator arm;
   wherein the system further includes a tray extend hard stop coupled to the proximity sensor.

6. A stowable payload carrier apparatus, comprising:
   a tray configured to receive one or more payloads of a plurality of different sizes, the tray being adaptable to accommodate dimensions of the one or more payloads of the plurality of different sizes, wherein the tray includes pin-receiving apertures;
   two or more pins adapted to be inserted into the pin-receiving apertures;
   an actuation device configured to cause the stowable payload carrier to rotate, extend, and retract the tray among a stowed configuration and one or more deployed configurations, the actuation device being operably coupled to the tray, wherein the tray is configured to be accessible by a manipulator arm on an unmanned vehicle;
   a proximity sensor configured to sense a location of the manipulator arm and to cause the tray to avoid physically contacting the manipulator arm;
   a tray extend hard stop that is operably coupled to the proximity sensor, the tray extend hard stop being configured to stop the tray from extending when the proximity sensor senses that the tray is within a predetermined distance from the manipulator arm; and
   a tray retract hard stop that is operably coupled to the proximity sensor, the tray retract hard stop being configured to stop the tray from retracting when the proximity sensor senses that the tray is within a predetermined distance from the manipulator arm.

7. The apparatus of claim 6, wherein the manipulator arm is operably coupled to an unmanned vehicle.

8. The apparatus of claim 6, wherein the actuation device includes a motor that is operably coupled to a gear box, wherein the motor and gearbox are enclosed in a housing.

9. The apparatus of claim 8, further comprising:
   a quick release pin that permits the apparatus to be installed and removed; and
   one or more bungee attach pins configured to secure the one or more payloads, wherein the one or more bungee attach pins are coupled to the housing,
   wherein the one or more bungee attach pins are further configured to automatically detach from the one or more payloads when the tray is in a predetermined position.

* * * * *